United States Patent [19]

Salmon

[11] Patent Number: 4,603,603
[45] Date of Patent: Aug. 5, 1986

[54] ELECTRONIC TRANSMISSION SHIFT CONTROLLER HAVING A CONTROLLED ALIGNMENT VALVE MECHANISM

[75] Inventor: Michael E. Salmon, Flint, Mich.

[73] Assignee: General Motors Corporation, Detroit, Mich.

[21] Appl. No.: 526,657

[22] Filed: Aug. 26, 1983

[51] Int. Cl.[4] .............................................. B60K 41/22
[52] U.S. Cl. ...................................... 74/868; 74/866; 74/752 A
[58] Field of Search ............. 74/866, 867, 868, 752 A, 74/752 C, 752 D, 856, 754, 740

[56] References Cited

U.S. PATENT DOCUMENTS

| | | | |
|---|---|---|---|
| 3,016,769 | 1/1962 | Christenson et al. ................. | 74/754 |
| 3,101,012 | 8/1963 | Christenson et al. ............. | 74/752 C |
| 3,602,055 | 8/1971 | Hause ..................................... | 74/753 |
| 3,732,753 | 5/1973 | Olsen et al. ........................... | 74/866 |
| 3,733,931 | 5/1973 | Nyman et al. ........................ | 74/868 |
| 4,326,433 | 4/1982 | Black et al. ........................... | 74/740 |
| 4,338,832 | 7/1982 | Pelligrino ............................. | 74/866 |
| 4,345,489 | 8/1982 | Muller et al. ......................... | 74/867 |

*Primary Examiner*—Lawrence Staab
*Assistant Examiner*—David A. Novais
*Attorney, Agent, or Firm*—Mark A. Navarre

[57] ABSTRACT

The drive establishing mechanisms of a multigear ratio transmission are actuated according to a predetermined schedule with an electronically operated two member valve mechanism. Gear shifting is effected by producing relative movement between the valve members and a pair of electrically regulated fluid pressure mechanisms which control the fluid supply and exhaust pressures for all of the drive establishing mechanisms.

1 Claim, 20 Drawing Figures

|      | 4th 114 | 3rd 104 | 2nd 106 | 1st 142 | R 128 | INPUT 102 |
|------|-----|-----|-----|-----|-----|-------|
| REV  | OFF | OFF | OFF | OFF | ON  | ON    |
| NEU  | OFF | OFF | OFF | OFF | OFF | ON    |
| 1st  | OFF | OFF | OFF | ON  | OFF | ON    |
| 2nd  | OFF | OFF | ON  | ON  | OFF | ON    |
| 3rd  | OFF | ON  | ON  | OFF | OFF | ON    |
| 4th  | ON  | ON  | ON  | OFF | OFF | OFF   |

ELECTRONIC TRANSMISSION SHIFT CONTROLLER HAVING A CONTROLLED ALIGNMENT VALVE MECHANISM

This invention relates to hydraulically actuated motor vehicle transmissions having a plurality of gear ratios and more particularly to a fluid pressure control mechanism for regulating shifting between gear ratios.

Gear selection in hydraulically actuated transmissions is achieved with a plurality of fluid-operated torque transmitting mechanisms referred to as clutches or brakes. The torque transmitting mechanisms are selectively engageable to define various drive paths through the transmission and each drive path establishes a different speed ratio between the transmission input and output shafts. For some shifts, a single torque transmitting mechanism is either engaged or disengaged while for other shifts, one torque transmitting mechanism must be engaged and another disengaged.

Conventional transmissions require a number of hydraulic elements for supplying fluid pressure to and exhausting fluid pressure from each of the torque transmitting mechanisms to effect engagement or disengagement of the same. In addition, the desired response of the hydraulic elements may vary depending upon the engine horsepower or the vehicle weight.

As a means of simplifying the shift control, it has been proposed to connect electrically actuable valves between the transmission fluid pressure source and each of the torque transmitting mechanisms. In such a system, the respective valves are selectively actuated to supply fluid pressure to or exhaust fluid pressure from an associated torque transmitting mechanism, and an electronic control unit controls the operation of each such valve so as to produce the desired transmission operation. However, such systems require a relatively large number of electrically operated valves and are therefore fairly expensive to produce.

Accordingly, it is an object of this invention to provide an improved electrically operated fluid pressure control mechanism for the torque transmitting mechanisms of a hydraulically actuated transmission.

More particularly, it is an object of this invention to provide an improved control mechanism of the above type wherein the fluid pressure supply and fluid pressure exhaust for all of the torque transmitting mechanisms of the transmission is regulated with a pair of electrically actuable solenoid valves, and wherein a third electrically actuable shuttle valve is operated to distinguish between upshifts and downshifts.

These objects are carried forward with a rotary valve device having first and second members which are rotatable relative to each other. The first member has a plurality of fluid conducting passages connected to respective torque transmitting mechanisms of the transmission and the second member has a pair of controlled pressure passages therein located relative to the fluid conducting passages of the first member such that rotational movement of the second member relative to the first member operates to successively connect the controlled pressure passages of the second member with the fluid conducting passages of the first member. It will be recognized, of course, that identical operation could be achieved with a valve having a pair of members movable linearly relative to each other.

The second member contains electrically actuable fluid pressure supply and exhaust valves. The supply valve is connected to the transmission fluid pressure source and is controllable to regulate the fluid pressure in a supply passage. The exhaust valve is connected to the transmission fluid reservoir and is controllable to regulate the fluid pressure in an exhaust passage.

An electrically actuable shuttle valve in the second member connects the supply and exhaust passages to the pair of controlled pressure passages. The shuttle valve is switchable between first and second positions for interchanging the fluid supply and exhaust passages with the pair of controlled pressure passages. Relative movement of the first and second members in one direction while the shuttle valve is actuated to a first position operates to successively connect controlled pressure passages of the second member with fluid conducting passages of the first member for upshifting the transmission. Opposite relative movement of the first and second members while the shuttle valve is actuated to a second position operates to successively connect controlled pressure passages of the second member with respective fluid conducting passages of the first member for downshifting the transmission.

A further aspect of the rotary valve is that the second member thereof includes line pressure passages located relative to the fluid conducting passages of the first member and the supply and exhaust passages of the second member so that once a respective torque transmitting mechanism is fully engaged, further relative movement of the first and second rotary valve members operates to connect a line pressure passage to the respective fluid conducting passage of the first member. This operation maintains the torque transmitting mechanism at the transmission line pressure and frees the fluid pressure supply valve to supply fluid pressure to another torque transmitting mechanism when further shifting operation is required. A similar operation is performed when the fluid pressure at a respective torque transmitting mechanism must be exhausted. Thus, each shift involves a transient phase wherein the first and second members are moved relative to each other such that an electrically actuable supply or exhaust valve is connected to fill or drain a respective torque transmitting mechanism, and a steady state phase wherein further relative movement of the first and second members results in the connection of the line pressure passages of the second member to the respective torque transmitting mechanism.

This invention relies on the following characteristic operation of hydraulically actuated transmissions: for any upshift, no more than one torque transmitting mechanism is engaged and no more than one torque transmitting mechanism is disengaged. Thus, the single electrically actuable fluid supply valve can supply fluid pressure to all of the torque transmitting mechanisms, and the single electrically actuable exhaust pressure control valve can exhaust fluid pressure from all of the torque transmitting mechanisms. The shuttle valve referred to above, enables this operation by selectively interchanging the fluid supply and exhaust passages with the controlled pressure passages.

IN THE DRAWINGS

FIGS. 7A and 7B are enlarged views of the shuttle valve depicted in FIG. 5. FIG. 7A shows the shuttle valve in a first position for transmission upshifts and FIG. 7B shows the shuttle valve in a second position for transmission downshifts.

FIGS. 8A-8J linearly depict the first and second members of the rotary valve for the various transmission gear ratios.

Figure 1:
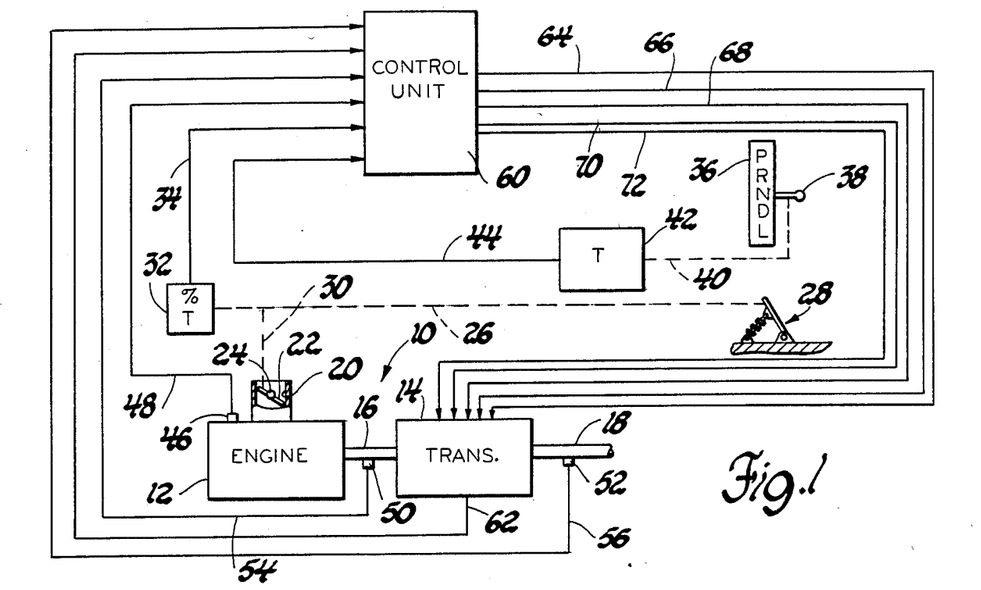
FIG. 1 is a schematic diagram of a motor vehicle engine and transmission and the control unit of this invention.

Referring now more particularly to FIG. 1, reference numeral 10 generally designates the drive train of a motor vehicle, including an engine 12, a transmission 14, a shaft 16 connecting the engine 12 to the transmission 14 and a transmission output shaft 18 which is adapted to rotatably drive a vehicle wheel. Engine 12 is depicted as a throttled internal combustion engine having a throttle bore 20 and a throttle plate 22 pivotable within throttle bore 20 about a pin 24 for controlling the amount of air ingested by engine 12. As the description of this invention proceeds, it will be apparent that this invention is also applicable to motor vehicle drive trains incorporating an unthrottled engine.

A mechanical linkage designated by the broken line 26 connects the throttle plate 22 to a conventional accelerator pedal assembly 28 and a further mechanical linkage designated by the broken line 30 connects the throttle plate 22 to a transducer 32. The transducer 32 may be any of a number of conventional devices such as a linear or rotary potentiometer that operates in response to a mechanical input movement to develop an electrical signal output on line 34 corresponding to the position of the mechanical input; in this case, the throttle position.

A manual ratio selector 36 is located in the passenger compartment of the vehicle and includes a lever 38 which is manipulated by the operator of the vehicle to indicate the desired gear range. The gear ranges are the same as those usually found in vehicles—Park (P), Reverse (R), Neutral (N), Drive (D), and Low (L). A mechanical linkage designated by the broken line 40 connects the lever 38 to a transducer 42 which, like transducer 32, produces an electrical signal output on line 44 corresponding to the position of the lever 38.

A pressure transducer 46 is responsive to the engine manifold absolute pressure and provides an electrical signal in accordance therewith on line 48.

Speed transducers 50 and 52 are located in proximity to shafts 16 and 18 and operate to provide electrical signals on lines 54 and 56 corresponding to the rotational velocity of the respective shafts. Speed transducers 50 and 52 may be any of a number of conventional devices for sensing shaft rotation and providing an electrical indication of the shaft velocity, one such device being a variable reluctance magnetic circuit which successively cooperates with magnetic teeth formed on the rotating shaft.

Figure 2:
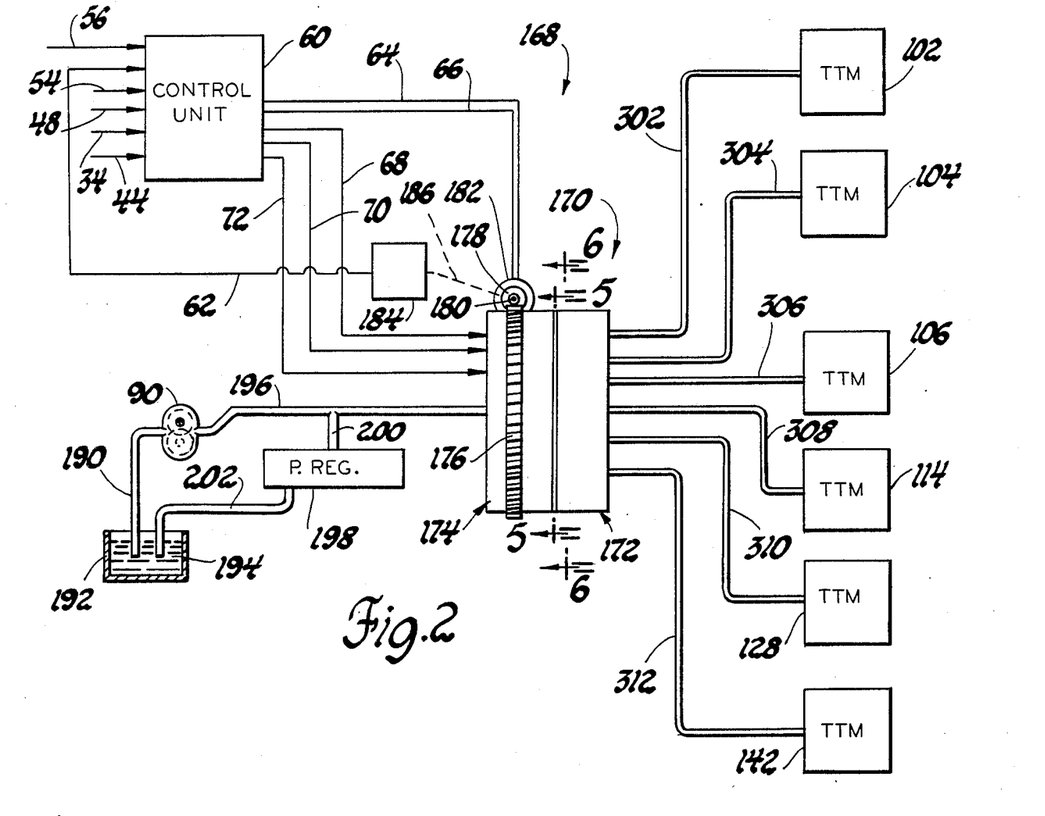
FIG. 2 schematically depicts the control unit and hydraulic elements of the transmission depicted in FIG. 1.

The electrical signal outputs of transducers 32, 42, 46, 50 and 52 on lines 34, 44, 48, 54 and 56 are connected as inputs to a control unit 60. A further input described below in reference to FIG. 2 is obtained internally of transmission 14 and is applied to control unit 60 via line 62. Control unit 60 analyzes the various electrical input signals and, on the basis of a preprogrammed sequence of operations, provides output signals on lines 64-72 for controlling the operation of the transmission 14. Flow charts which outline the preprogrammed sequence of operation are described below in reference to FIGS. 9 and 10.

Figure 3:
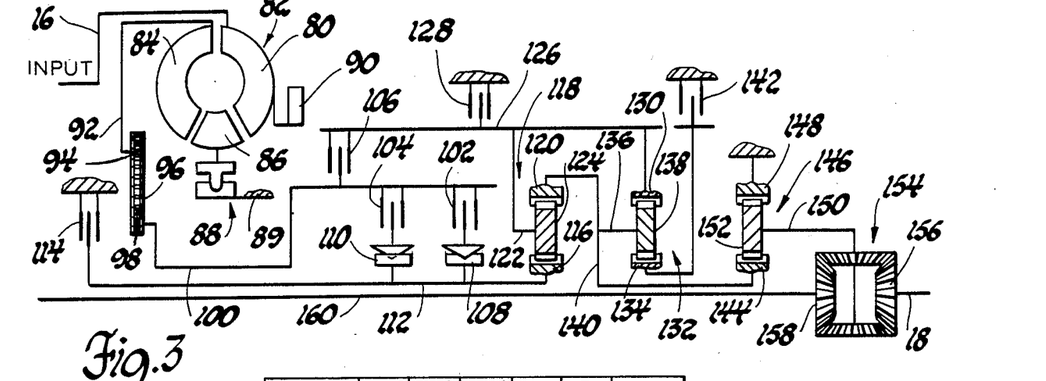
FIG. 3 is a schematic diagram of a hydraulically actuated transmission to which the control mechanism of this invention may be applied.

Transmission 14 is of conventional design in that it contains a number of fluid operated torque transmitting mechanisms, such as clutches and brakes, which are engaged or disengaged according to a predetermined schedule for establishing a desired drive path through the transmission. For the purpose of facilitating a description of the present invention, a transmission of the above type is schematically depicted in FIG. 3. The engagement and disengagement schedule for establishing the desired drive path or gear ratio is given in FIG. 4.

Referring now more particularly to FIG. 3, shaft 16 drives an impeller 80 of a conventional hydraulic torque converter 82. Torque converter 82 also includes a turbine 84 and a stator 86 which is connected through a conventional one-way brake 88 to a portion of the transmission housing as designated by the reference numeral 89. The impeller 80 is drivingly connected to a hydraulic pump 90 which supplies fluid for the control system.

The turbine 84 of torque converter 82 is drivingly connected through a hub 92 to a sprocket 94 which in turn is connected through a chain 96 to a sprocket 98. The sprocket 98 drives a transmission input shaft 100 which has operatively connected thereto an input clutch 102, a third gear clutch 104 and a second gear clutch 106. The clutches 102 and 104 are drivingly connected to respective one-way drive devices 108 and 110 which in turn, are connected to an intermediate sleeve shaft 112. The sleeve shaft 112 is connected to a first gear brake 114 and to a sun gear 116 which is a component of a planetary gear set 118.

The planetary gear set 118 also includes a ring gear 120 and a carrier 122 on which is rotatably mounted a plurality of pinion gears 124 which mesh with the sun gear 116 and the ring gear 120. The carrier 122 is connected to a hub 126 which has operatively connected thereto the second gear clutch 106 and a reverse gear brake 128. The hub 126 is also connected to a ring gear 130 which is a component of a planetary gear set 132.

The planetary gear set 132 also includes a sun gear 134, a carrier 136 and a plurality of pinion gears 138 rotatably mounted on carrier 136 and meshing with the ring gear 130 and the sun gear 134. The carrier 136 is connected to the ring gear 120 of planetary gear set 118 and to a planetary output shaft 140. The sun gear 134 is connected to a first gear brake 142.

The planetary output shaft 140 is drivingly connected to a sun gear 144 which is a component of a planetary gear set 146 which further includes a ring gear 148 and a planet carrier 150 on which is rotatably mounted a plurality of pinion gears 152 meshing with the sun gear 144 and the ring gear 148. The ring gear 148 is continually grounded to the transmission housing as shown and the carrier 150 is drivingly connected to a conventional bevel gear differential arrangement 154. One of the differential side gears 156 is connected to the output shaft 18 and the other side gear 158 is connected to an output shaft 160, it being understood that only output shaft 18 is depicted in FIG. 1.

The clutches 102, 104 and 106 and the brakes 114, 128 and 142 are conventional fluid operated torque transmitting devices which are well-known in the power transmission art. The planetary gearing arrangement comprised of planetary gear sets 118 and 132 is substantially the same as that shown in the U.S. Pat. No. 3,602,055 issued to Hause on Mar. 2, 1970, and assigned to the assignee of this application. The above-mentioned patent provides a complete description of the gearing, the friction devices and the one-way clutches. The planetary gear set 146 provides a reduction ratio between the planetary output shaft 140 and the differential arrangement 154. The transmission is shown schematically as aligned for use in a transverse front wheel drive application. In such installations, the planetary gear set 146 is considered to be providing the final drive ratio.

Figure 4:
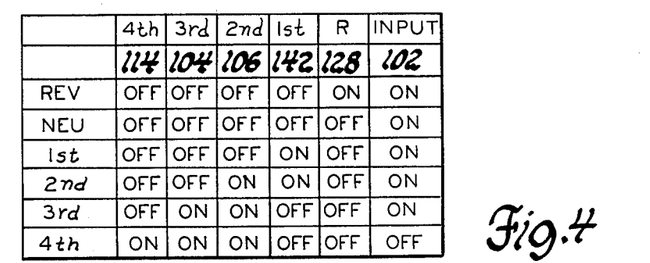
FIG. 4 is a chart setting forth the torque transmitting mechanism conditions required for engaging each of the gear ratios available in the transmission depicted in FIG. 3.

It is sufficient for an understanding of the present invention to realize that the gear ratios which can be established within the planetary gear arrangements 118 and 132 consist of four forward speeds, the reverse speed and a neutral. The chart shown in FIG. 4 depicts the clutch or brake engagement and disengagement schedule for the various ratio establishing conditions within the transmission. As an example, it will be seen in reference to the chart that first gear is established by disengaging the fourth gear brake 114, the third gear clutch 104, the second gear clutch 106 and the reverse brake 128, and by engaging the first gear brake 142 and the input clutch 102. To shift from first gear to second gear, the second gear clutch 106 is engaged. To shift from second gear to third gear, the third gear clutch 104 is engaged and the first gear brake 142 is disengaged. To shift from third gear to fourth gear, the fourth gear brake 114 is engaged and the input clutch 102 is disengaged.

The control elements of transmission 14 which are most pertinent to the shift control mechanism of this invention are depicted in FIG. 2 and are designated generally by reference numeral 168. Where appropriate, the reference numerals used in reference to FIGS. 1 and 3 have been repeated. Thus, the torque transmitting mechanisms are designated by the reference numerals 102, 104, 106, 114, 128 and 142; the pump is designated by reference numeral 90, and the control unit is designated by the reference numeral 60.

A rotary valve mechanism designated generally by the reference numeral 170 includes a first member 172 and a second member 174 which is rotatable relative to the first member 172. The first member 172 is fixed and the second member is adapted to be rotated. To effect rotation of the second member 174, gear teeth 176 are provided about the periphery of the second member 174 and such teeth 176 are engaged by a worm gear 178 which is attached to the output shaft 180 of an electric motor 182. The motor 182 may be energized to rotate worm gear 178 in either a clockwise or counterclockwise direction for selectively effecting clockwise or counterclockwise relative movement of the first and second members 172 and 174. Control unit 60 regulates the energization of motor 182 via lines 64 and 66.

The rotary position of the second member 174 of rotary valve 170 is sensed by transducer 184. A mechanical linkage designated by the broken line 186 connects the motor output shaft 180 to transducer 184 and transducer 184 provides an electrical signal output on line 62 corresponding to the rotary position of the second member 174, such signal being applied as an input to control unit 60 via line 62.

As noted in reference to FIG. 3, pump 90 supplies fluid under pressure to the various elements of transmission 14. The input of pump 90 is connected via line 190 to a reservoir 192 filled with transmission fluid 194 and the output of pump 90 is connected to line 196 which supplies fluid under pressure to the second member 174 of rotary valve 170. A pressure regulator valve 198 is connected between line 196 and reservoir 192 via lines 200 and 202 and operates in a conventional manner to controllably return a portion of the fluid in line 196 to reservoir 192 for the purpose of regulating the fluid pressure in line 196 to a predetermined value. The pressure of the fluid in line 196 is conventionally and hereinafter referred to as the transmission line pressure, and the rotary valve mechanism 168 operates in a manner to be described to selectively direct such line pressure via lines 302–312 to the torque transmitting mechanisms 102, 104, 106, 114, 128 and 142.

Figure 5:
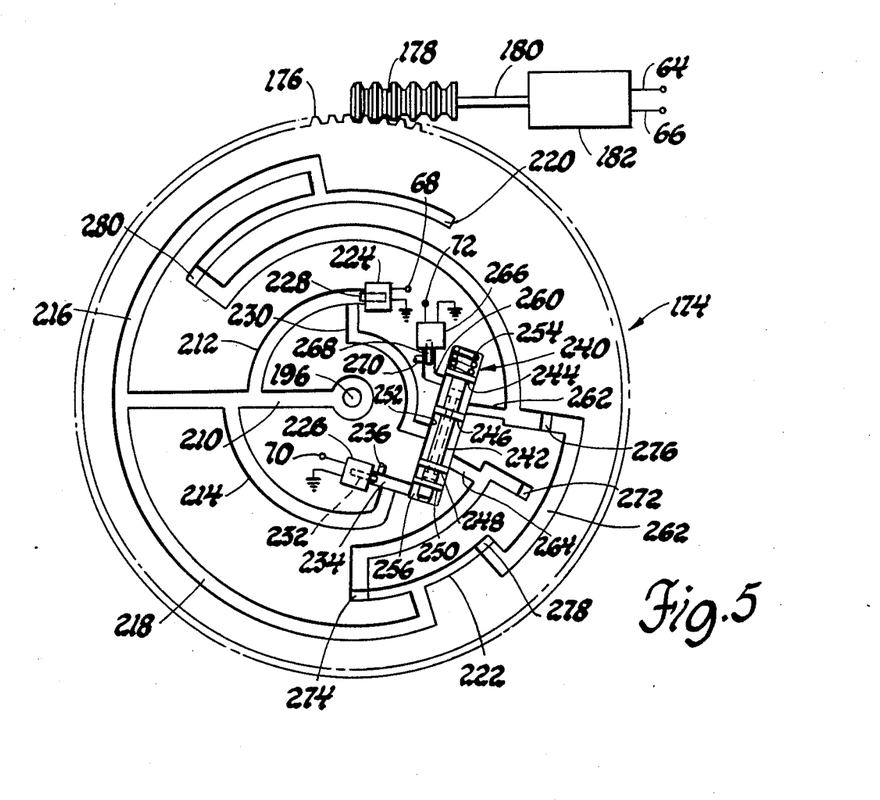
FIG. 5 is a cross-sectional view of the second member of the rotary valve taken along lines 5—5 as depicted FIG. 2.

Referring now more particularly to FIG. 5, the second member 174 of rotary valve 170 is shown in detail. Where appropriate, the reference numerals used in reference to FIGS. 1 and 2 have been repeated. As indicated in FIG. 2, line pressure is supplied to the center of second member 174 via line 196. A suitable seal mechanism (not shown) prevents fluid leakage at the junction of line 196 and the second member 174. A network of passages 210–218 direct line pressure from line 196 to line pressure ports 220 and 222 and to electrically actuated supply valve 224 and electrically actuated control valve 226. As will be seen below in reference to FIG. 6, line pressure ports 220 and 222 are adapted to communicate with and supply hydraulic fluid at line pressure to complementary ports formed on the face of the first member 172.

Supply valve 224 is a conventional solenoid operated device having a plunger 228 movable within passage 212 to selectively connect passage 212 to passage 230. A spring or other resilient mechanism (not shown) biases plunger 228 to a position isolating passages 212 and 230, and the solenoid is energizable to overcome the spring or resilient force to move plunger 228 to the position shown in FIG. 5, connecting passages 212 and 230. One terminal of the solenoid is connected to ground potential and the other is connected to line 68. As will later be explained and as shown in FIGS. 1 and 2, control unit 60 is adapted to selectively energize the solenoid of valve 224 via line 68 for the purpose of controlling the fluid pressure in passage 230.

Like supply valve 224, control valve 226 is a conventional solenoid operated device having a movable plunger 232. Passage 214 supplies line pressure to passage 234, and plunger 232 is movable within passage 234 to selectively expose passage 214 to exhaust passage 236. Exhaust passage 236 is connected by a further hydraulic passage (not shown) to the transmission fluid reservoir 192. A spring or other resilient member (not shown) biases plunger 232 to a position which blocks exhaust passage 236, and the solenoid is energizable to overcome the spring or resilient force to retract plunger 232 to the position shown in FIG. 5, thereby shunting the fluid pressure in line 234 to exhaust passage 236. One terminal of the solenoid of valve 226 is connected to ground potential and the other is connected to line 70. As will later be explained and as shown in FIGS. 1 and 2, control unit 60 is adapted to selectively energize valve 226 via line 70 for the purpose of generating a control pressure, the magnitude of which is a function of whether the desired shift is an upshift or a downshift.

Figure 7A:
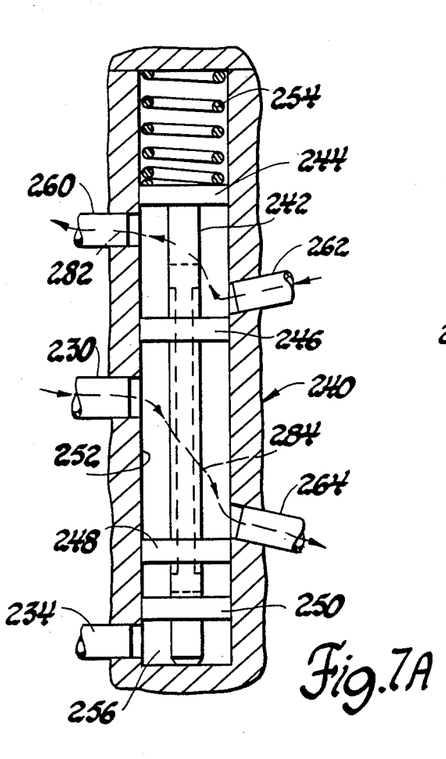
Figure 7B:
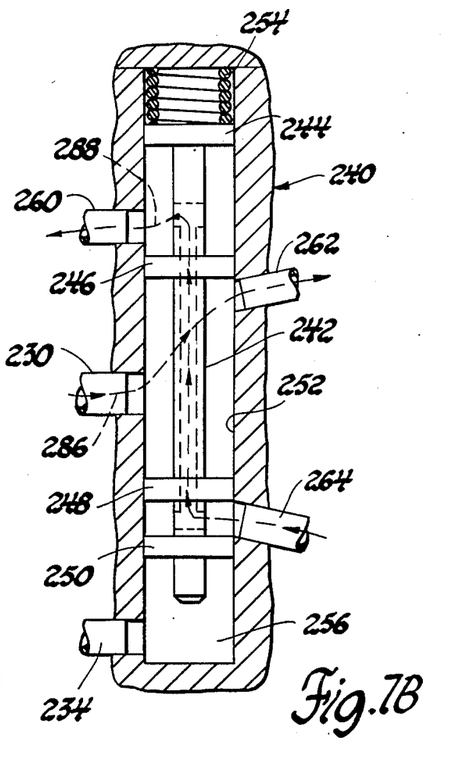

A shuttle valve designated generally by the reference numeral 240 is formed within the second member 174 but is shown for convenience as though it were formed on the face thereof. The stem 242 of shuttle valve 240 has four equal diameter lands 244–250 formed thereon, and is axially movable within the valve bore 252. The stem 242 is drilled as shown to form a fluid passage between the area bounded by lands 244 and 246 and the area bounded by lands 248 and 250. The position of the valve stem 242 and lands 244–250 within the valve bore 252 is controlled by spring 254 and the opposing fluid pressure in chamber 256. The fluid passage 234 is connected to chamber 256 and control valve 226 is actuated to control the pressure therein for effecting the operation of the shuttle valve 240. When the solenoid of control valve 226 is energized, the plunger 232 is retracted to exhaust the fluid in chamber 256 and spring 254 biases the valve stem 242 to the position shown in FIGS. 5 and 7A. When the solenoid of control valve 226 is de-energized, the plunger 232 is extended to block exhaust passage 236, and the line pressure in passage 214 is directed via passage 234 to chamber 256. In such case, the fluid acting on land 250 produces a force which overcomes the spring force, and the valve stem 242 is biased to the opposite position shown in FIG. 7B. As will later be seen, the position shown in FIG. 7A is used for upshifting and the position shown in FIG. 7B is used for downshifting. Four fluid conducting passages—supply passage 230, exhaust passage 260 and ported passages 262 and 264—are connected to shuttle valve 240 for controlling the supply and exhaust of fluid pressure to the torque transmitting mechanisms of the transmission.

The controlled supply pressure for engaging the torque transmitting mechan is directed through supply passage 230, and the controlled exhaust pressure for disengaging the torque transmitting mechanisms is directed through exhaust passage 260. The supply pressure in supply passage 230 is controlled by supply valve 224 as described above, and the exhaust pressure in exhaust passage 260 is controlled by exhaust valve 266. Like supply valve 224 and control valve 226, exhaust valve 266 is a conventional solenoid operated valve having a plunger 268 movable within exhaust passage 260. A spring or other resilient member (not shown) biases plunger 268 to the position shown in FIG. 5 to block exhaust passage 270, and the solenoid is energizable to overcome the spring or resilient member to retract the plunger 268 to exhaust fluid pressure in exhaust passage 260. The passage 264 connects the shuttle valve 240 to ports 272 and 274, and the passage 262 connects the shuttle valve to ports 276, 278 and 280.

The shuttle valve 240 connects the supply and exhaust passages 230 and 260 to the ported passages 262 and 264. The flow paths through shuttle valve 240 are determined by the position of the shuttle valve stem 242 which in turn is determined by the energization state of control valve 226. When the control valve 226 is energized and the valve stem 242 assumes the position shown in FIG. 7A, supply passage 230 is connected to ported passage 264 and exhaust passage 260 is connected to ported passage 262. The flow paths are indicated by the broken lines 282 and 284. In this state, the ports connected to passage 264—ports 272 and 274—are used to direct apply fluid from the supply valve 224 to the various clutch and brake elements, and the ports connected to passage 262—ports 276, 278 and 280—are used to direct exhaust fluid from the various clutch and brake elements to the exhaust valve 266 and the fluid reservoir 192. As will later be described, this state of shuttle valve 240 is used for upshifting the transmission 14.

When the control valve 226 is de-energized and the valve stem 242 assumes the position shown in FIG. 7B, supply passage 230 is connected to ported passage 262 and exhaust passage 260 is connected through the center of valve stem 242 to ported passage 264. In this state, the ports connected to passage 264 are used to direct exhaust fluid from the various clutch and brake elements to the exhaust valve 266 and the fluid reservoir 192, and the ports connected to passage 262 are used to direct apply fluid from the supply valve 224 to the various clutch and brake elements. The flow paths for this state are depicted in FIG. 7B by the broken lines 286 and 288. As will later be described, this state of shuttle valve 240 is used for downshifting the transmission 14.

Figure 6:
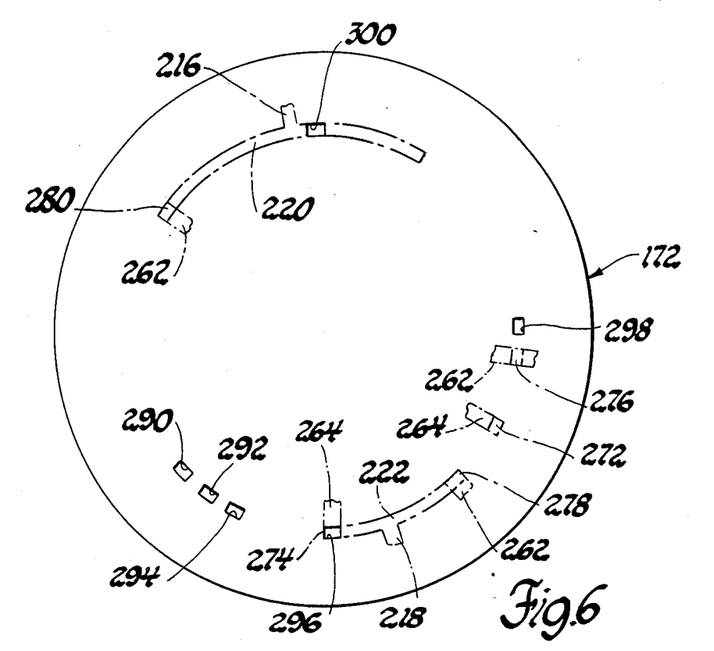
FIG. 6 is a cross-sectional view of the first member of the rotary valve taken along lines 6—6 as depicted in FIG. 2.

FIG. 6 is a view of first member 172 of rotary valve 170 taken along the lines 6—6 as defined in FIG. 2. The cross section shading has been omitted for the sake of clarity. The member 172 includes a number of ports 290–300 formed on the face thereof and such ports are connected via fluid passages 302–312 (as shown in FIG. 2) to the various torque transmitting mechanisms of the transmission 14. As indicated in FIG. 6, the ports 290–300 of member 172 are located relative to the ports of member 174 (shown in broken lines) such that rotation of the member 174 relative to the member 172 results in a predetermined sequence of fluid communication between the members 172 and 174. For the position depicted in FIG. 6, the port 296 of member 172 is connected to the port 274 of member 174 and the port 300 of member 172 is connected to the line pressure port 220 of member 174. The remaining ports 290, 292, 294 and 298 of member 172 are not in communication with the ports of member 174.

As noted in reference to FIG. 2, the ports 290–300 of member 172 are connected via lines 302–312 to the various torque transmitting mechanisms of transmission 14. More particularly, port 290 is connected via line 302 to input clutch 102; port 292 is connected via line 304 to third gear clutch 104; port 194 is connected via line 306 to second gear clutch 106; port 196 is connected via line 308 to fourth gear brake 114; port 198 is connected via line 310 to reverse gear brake 128; and port 300 is connected via line 312 to first gear brake 142. Thus, for the position of the rotary members 172 and 174 depicted in FIG. 6, the input clutch 102 is connected to line pressure through line pressure port 220 and the first gear brake 142 is connected to either the apply valve 224 or the exhaust valve 266, depending upon the position of shuttle valve 240.

Referring now to FIG. 8, the relative movement of rotary valve members 172 and 174 required to establish the various gear ratios of transmission 14 will be described.

For convenience, the ports 290–300 of member 172 and the ports 274, 222, 278, 272, 276, 220 and 280 of member 174 are shown linearly, alignment of the ports indicating fluid communication therebetween. Thus, in FIG. 8A, the port 296 of member 172 is connected to port 274 of member 174 and the port 300 of member 172 is connected to line pressure port 220 of member 174. This is the same port alignment depicted in FIG. 6 and, as noted in reference to that figure, serves to connect line pressure to input clutch 102 and a control pressure (via port 296) to first gear brake 142. The input clutch 102 is engaged by the line pressure and the engagement of first gear brake 142 is governed by the energization of either apply valve 224 or exhaust valve 266, depending on whether control valve 226 is de-energized or energized.

To explain the operation of the control system of this invention, an upshift sequence will be described with reference to FIGS. 8A-8G. As indicated above, an upshift requires that control valve 226 be de-energized. As a result, the output passage 230 of apply valve 224 is connected through the shuttle valve 240 and passage 264 to ports 274 and 272, and the passage 260 of the exhaust valve 266 is connected through shuttle valve 240 and passage 262 to ports 276, 278 and 280. As will be seen, the various ports of members 172 and 174 are arranged to engage the brakes and clutches of the transmission 14 according to the schedule given in FIG. 4. Each shift includes a transient phase during which a control pressure progressively engages or disengages the appropriate clutches or brakes, and a steady state phase during which the respective clutches or brakes are connected directly to line pressure.

Figure 8A:
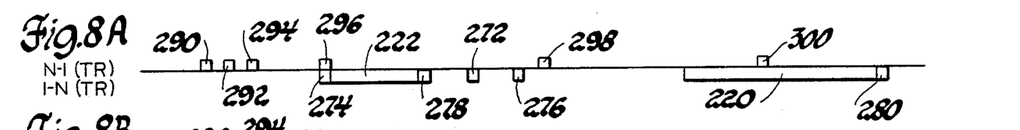
Figures 8B, 8C:
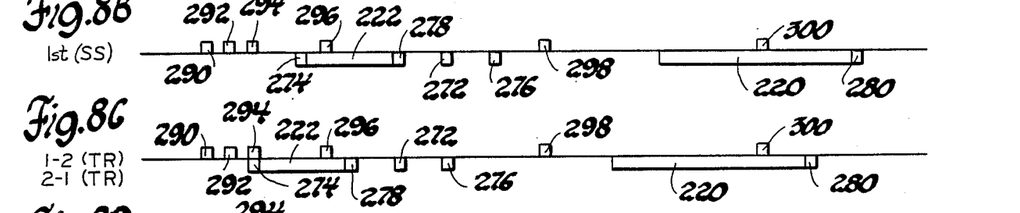

FIGS. 8A and 8B represent transient and steady state phases of a shift from Neutral (N) to first gear. As can be seen from the chart depicted in FIG. 4, this shift is initiated by engaging the first gear brake 142. The transient phase involves progressively increasing the fluid pressure applied to the first gear brake 142 from zero to line pressure. Thus, the position shown in FIG. 8A connects port 296 of the member 172 to port 274 of the member 174. Control unit 60 pulse-width-modulates the solenoid of apply valve 224 to increase the pressure according to a desired pressure vs. time profile, and when the apply pressure reaches line pressure, the valve member 174 is rotated to the position depicted in FIG. 8B, connecting the port 296 to line pressure port 222. The valve position depicted by FIG. 8B is maintained so long as first gear operation is desired. For the positions shown by both FIGS. 8A and 8B, the port 300 which is connected to input clutch 102, is in fluid communication with line pressure port 220 to maintain input clutch 102 engaged.

Figures 8D, 8E:
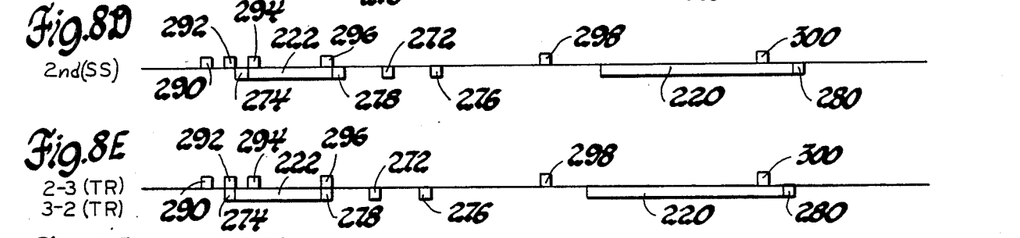

An upshift from first gear to second gear is represented by FIGS. 8C and 8D. FIG. 8C represents the transient phase of the shift, and FIG. 8D represents the steady state phase of the shift. As can be seen in reference to the chart in FIG. 4, the 1-2 upshift involves engaging the second gear clutch 106. To this end, control unit 60 rotates the valve member 174 to align the ports as shown in FIG. 8C. In such position, the port 294 of member 172, which is connected to second gear clutch 106, is placed in fluid communication with the port 274 of the member 174. Control unit 60 then pulse-width-modulates the solenoid of supply valve 224 to progressively increase the pressure applied to the second gear clutch 106 from zero to line pressure according to a desired pressure vs. time profile. When the pressure applied to second gear clutch 106 reaches line pressure, control unit 60 rotates the valve member 174 to the position shown in FIG. 8D, thereby connecting the port 294 to line pressure port 222. The position shown in FIG. 8D represents the steady state phase of the 1-2 shift and is maintained as long as second gear operation is desired. During both phases of the 1-2 shift, port 300 which is connected to input clutch 102, is in fluid communication with line pressure port 220 to maintain input clutch 102 engaged.

Figure 8F:
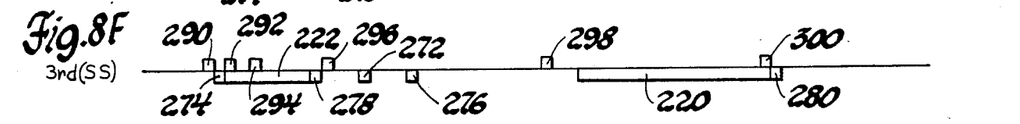

FIGS. 8E and 8F represent the transient and steady state phases of a 2-3 upshift. As seen in reference to the chart in FIG. 4, this shift requires that the third gear clutch 104 be engaged and the first gear brake 142 be disengaged. To this end, control unit 60 first rotates the member 174 to align the valve ports to the position shown in FIG. 8E. In such position, port 292 which is connected to third gear clutch 104 is placed in fluid communication with port 274 of member 174, and the port 296 which is connected to first gear brake 142, is placed in fluid communication with the port 278 of member 174. The control unit 60 then pulse-width-modulates the solenoids of both supply valve 224 and exhaust valve 266. Supply valve 224 is energized in a manner to increase the pressure applied to third gear clutch 104 from zero to line pressure, while exhaust valve 266 is energized in a manner to progressively decrease the pressure applied to first gear brake 142 from line pressure to zero. When third gear clutch 104 is fully engaged and first gear brake 142 is fully disengaged, control unit 60 moves the member 174 to align the ports as shown in FIG. 8F. In such position, the ports 292 and 294 are connected to line pressure port 222 to maintain engagement of second gear clutch 106 and third gear clutch 104, and the port 296 is isolated to maintain disengagement of first gear brake 142. For both phases of the 2-3 upshift, the port 300 which is connected to input clutch 102, is in fluid communication with line pressure port 220 to maintain engagement of input clutch 102, as required by the chart of FIG. 4. The rotary valve 170 is maintained in the position represented by the FIG. 8F so long as third gear operation is desired.

Figure 8G:
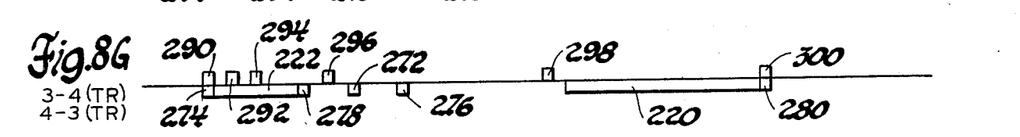
Figure 8H:
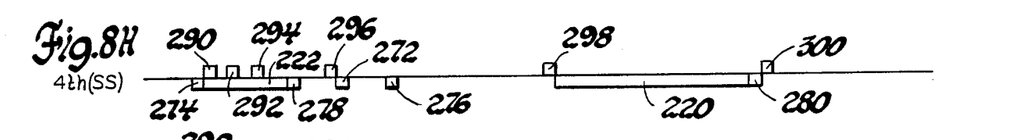

FIGS. 8G and 8H represent the transient and steady state phases of a 3-4 upshift. As seen in reference to the chart in FIG. 4, this shift requires that the fourth gear brake 114 be engaged and the input clutch 102 be disengaged. To this end, control unit 60 moves valve member 174 to align the valve ports as shown in FIG. 8G. In such position, port 290 which is connected to fourth gear brake 114, is placed in fluid communication with port 274, and port 200, which is connected to the input clutch 102, is placed in fluid communication with port 280. Control unit 60 then pulse-width-modulates the solenoids of supply valve 224 and exhaust valve 266 to increase the pressure applied to fourth gear brake 114 from zero to line pressure and to decrease the pressure applied to input clutch 102 from line pressure to zero. When fourth gear brake 114 is fully engaged and input clutch 102 is fully disengaged, control unit 60 moves the valve member 174 to align the valve ports as shown in FIG. 8H. In such position, ports 290, 292 and 294 are connected to line pressure port 222 to maintain engagement of fourth gear brake 114, third gear clutch 104 and second gear clutch 106; and port 300 is isolated to maintain disengagement of input clutch 102. The valve position depicted in FIG. 8H is maintained so long as fourth gear operation is desired.

To initiate a downshift sequence, control valve 226 is energized to shift the valve stem 242 of shuttle valve 240 to the position shown in FIG. 7B. This serves to interchange the passages 260 and 230 with the passages 262 and 264 so that apply pressure is directed through ports 272 and 274. As an example of a downshift, a 4-3 downshift will be described. As seen in reference to the chart in FIG. 4, this shift requires that the fourth gear brake 114 be disengaged and the input clutch 102 be engaged. To this end, the control unit 60 moves the valve member 174 to align the ports as shown in FIG. 8G. In such position, the port 290 which is connected to fourth gear brake 114, is placed in fluid communication with port 274, and the port 300 which is connected to input clutch 102, is placed in fluid communication with port 280. Control unit 60 then pulse-width-modulates the solenoids of supply valve 224 and exhaust valve 266 so as to decrease the pressure applied to fourth gear brake 114 from line pressure to zero and to increase the pressure applied to input clutch 102 from zero to line pressure. When fourth gear brake 114 is fully disengaged and input clutch 102 is fully engaged, control unit 60 moves the valve member 174 to align the valve ports in the position shown in FIG. 8F, thereby maintaining engagement of third gear clutch 104, second gear clutch 106, and input clutch 102 while maintaining the disengagement of fourth gear brake 114.

In view of the above, it will be understood that FIG. 8A represents the transient phase (TR) of any shift between Neutral (N) and first gear; FIG. 8C represents the transient phase (TR) of any shift between first gear and second gear; FIG. 8E represents the transient phase (TR) of any shift between second gear and third gear; and FIG. 8G represents the transient phase (TR) of any shift between third gear and fourth gear. FIG. 8B represents the steady state phase (SS) for first gear; FIG. 8D represents the steady state phase (SS) for second gear; FIG. 8F represents the steady state phase (SS) for third gear; and FIG. 8H represents the steady state phase (SS) for fourth gear.

Figure 8I:
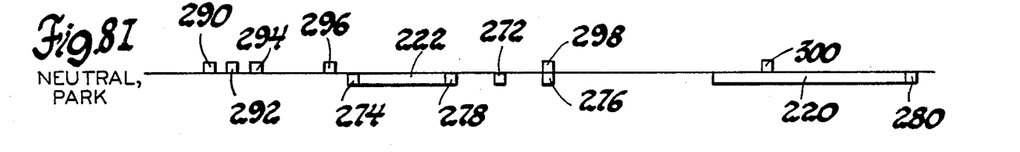
Figure 8J:
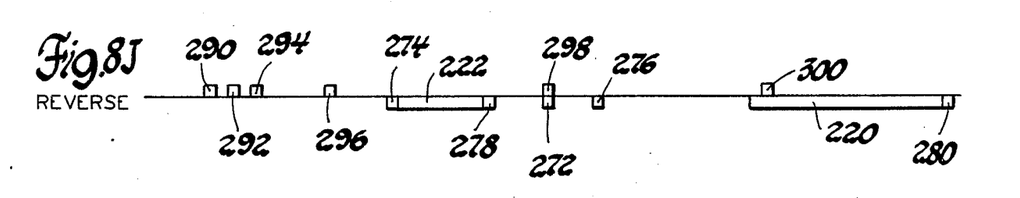

The valve position required to establish Neutral (N) or Park (P) is depicted in FIG. 8I, and the valve position required to establish Reverse (R), is depicted in FIG. 8J. To establish either Neutral (N), Park (P) or Reverse (R) gears, the control valve 226 must be de-energized so that supply pressure is directed through port 272, and exhaust pressure is directed through port 276. In both cases, the port 300 is connected to line pressure port 220 to maintain engagement of input clutch 102. In Neutral (N) or Park (P), port 298, which is connected to reverse brake 128, is connected to port 276, and control unit 60 de-energizes exhaust valve 266 to maintain a zero apply pressure at reverse brake 128 to ensure disengagement of the same. To establish Reverse (R) gear, control unit 60 moves the valve member 174 to the position shown in FIG. 8J to connect port 298 to port 272. Then control unit 60 pulse-width-modulates the solenoid of apply valve 224 to progressively increase the pressure applied to the reverse brake 128 from zero to line pressure. This position of member 174 is then maintained so long as Reverse (R) gear operation is desired.

Figure 9:
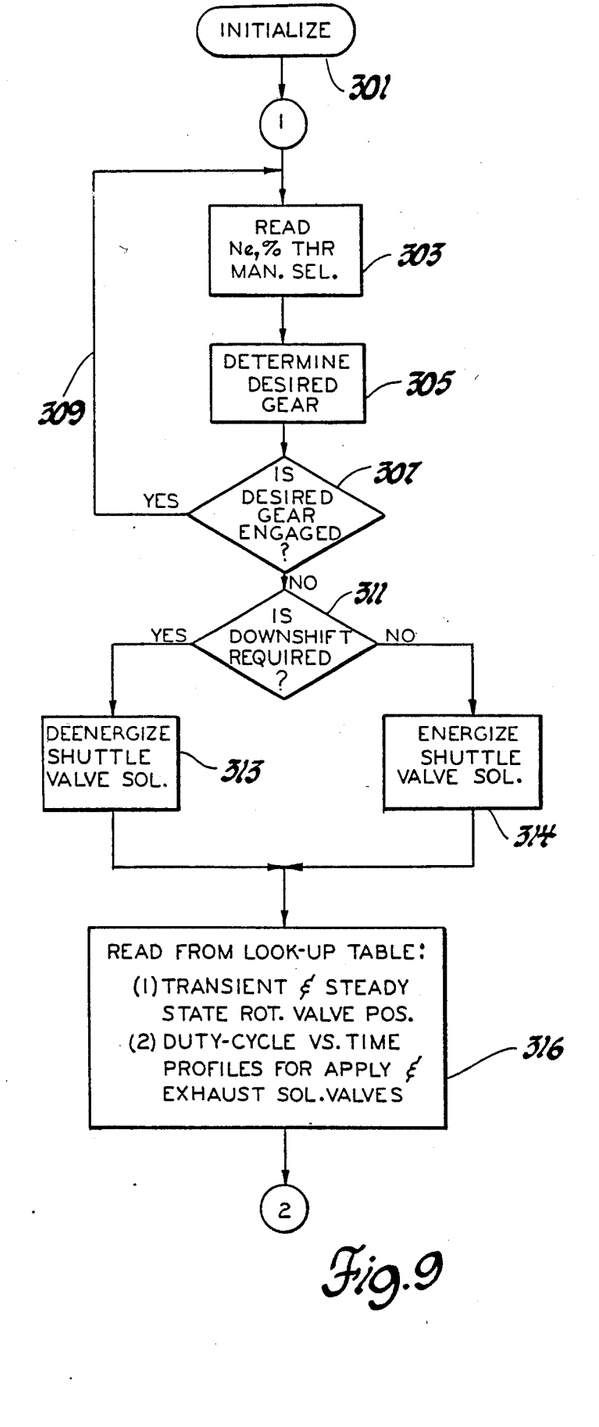
FIGS. 9 and 10 are flow diagrams for implementing the control functions of this invention with a microcomputer based control unit.
Figure 10:
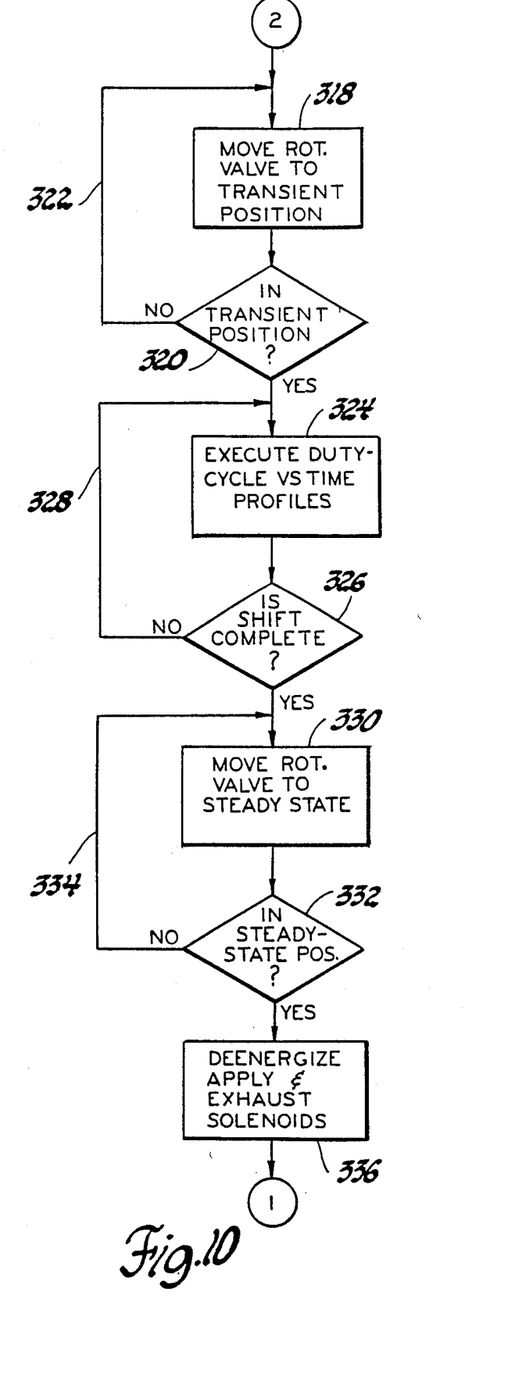

The flow diagrams depicted in FIGS. 9 and 10 represent program instructions for implementing the above-described shift control functions with a microprocessor based control unit. An example of a suitable microprocessor for performing such control functions is the MC 6809 microcomputer manufactured by Motorola Semiconductor Products, Inc., Austin, Tex. It will, of course, be understood that a suitable control unit might also include other electronic devices for storing pressure vs. time profiles and for developing sufficient output current to energize the solenoid valves 224, 266 and 226 and the DC motor 182.

Referring now more particularly to FIG. 9, reference numeral 301 designates a series of instructions to be executed each time the vehicle electrical system is powered up for initializing the various input registers in control unit 60 to zero. Instruction block 303 is then executed to read input values of engine speed ($N_e$) as measured by transducer 50; percent throttle as measured by transducer 32; manual selector position as measured by transducer 42; vehicle speed as measured by transducer 52; engine load as measured by transducer 46; and motor position as measured by transducer 184. As indicated at instruction block 305, control 60 then determines the desired transmission gear ratio as a function of the engine load and vehicle speed. This function is commonly referred to as shift pattern generation, the exact nature of which is not pertinent to the present invention. Control unit 60 then determines whether the desired gear ratio is engaged, as indicated at instruction block 307. This may be determined by, for example, dividing the vehicle speed reading by the engine speed reading and comparing the result with known values representing the gear ratios established by the various transmission drive paths. If the desired gear ratio is engaged, a shift is not required and flow diagram line 309 returns the control unit 60 to re-execute instruction blocks 303 and 305. If the desired gear ratio is not engaged, instruction block 311 is executed to determine if an upshift or a downshift is required. If a downshift is required, instruction block 313 is executed to de-energize the control valve 226 to shift the valve stem 242 of shuttle valve 240 to the position depicted in FIG. 7B. If an upshift is required, instruction block 314 is executed to energize control valve 226 to shifts the valve stem 242 of shuttle valve 240 to the position depicted in FIG. 7A. Thereafter, control unit 60 executes instruction block 316 for retrieving previously stored transient and steady state positions of rotary valve member 174 for the desired gear ratio. In addition, supply and/or exhaust valve duty cycle vs. time profiles are retrieved. In this regard, it will be appreciated that the duty cycle vs. time profile may be stored as a "family of curves" as a function of gear ratio and engine load. Techniques for storing and retrieving information of this type are well-known in the prior art of electronic engine and transmission control and are not described herein. Then, as indicated by the circled numeral connector 2, control unit 60 executes instruction block 318 of FIG. 10 to move the rotary valve member 174 to the transient position retrieved from memory in step 1 of instruction block 316. If the shift is a 2-3 upshift, for example, control unit 60 energizes DC motor 182, via lines 64 and 66, to move the valve member 174 to a position that aligns the valve ports as shown in FIG. 8E. Instruction block 320 is then executed to verify if the transient position has been attained, as may be determined by comparing the output of transducer 184 with the desired position retrieved from memory. If not, flow diagram line 322 directs control unit 60 to re-execute instruction block 318. When the transient position has been attained, instruction block 324 is executed by control unit 60 to pulse-width-modulate the solenoid of apply valve 224 and/or the solenoid of exhaust valve 266 to generate the retrieved duty cycle vs. time profile. Instruction block 326 is then executed to determine if the shift is complete, as may be judged by comparing the actual transmission speed ratio to the desired speed ratio. If the shift is not complete, flow diagram line 328 directs the re-execution of instruction block 324. If the shift is complete, control unit 60 executes instruction block 330 to move the rotary valve member 174 to the steady state position retrieved in step 1 of instruction block 316. If the shift is a 2-3 upshift, for example, execution of instruction block 330 causes control unit 60 to energize DC motor 182 via lines 64 and 66 to move the valve member 174 to align the various valve ports as shown in FIG. 8F. Instruction block 332 is then executed to determine if the steady state position has been attained, as may be judged by comparing the output of transducer 184 to the desired position. If the steady state position has not been attained, flow diagram line 334 causes the re-execution of instruction block 330. Once the steady state position has been achieved, control unit 60 executes instruction block 336 to de-energize the solenoids of supply and/or exhaust valves 224 and 266. Then, as indicated by the circled numeral 1 connector, control unit 60 re-executes the flow diagram to read new input values and determine if another gear shift is required.

It will, of course, be understood that this invention is not limited to the particular embodiment illustrated and described herein. In this regard, it will be recognized that various modifications other than those mentioned herein may occur to those skilled in the art and that such systems may fall within the scope of this invention which is defined by the appended claims.

The embodiments of the invention in which an exclusive property or privilege is claimed are defined as follows:

1. In a motor vehicle multigear ratio transmission having a line pressure fluid source and a plurality of fluid operated drive establishing mechanisms selectively actuated according to a predetermined schedule to effect gear ratio shifting, apparatus comprising;

fluid supply means intermittently actuable to connect the line pressure source to a fluid supply passage to thereby affect the fluid pressure therein;

fluid exhaust means intermittently actuable to exhaust fluid from a fluid exhaust passage to thereby affect the fluid pressure therein;

fluid directing means for selectively actuating the drive establishing mechanisms to effect gear ratio shifting by selectively connecting the fluid supply and exhaust passages to the drive establishing mechanisms according to the predetermined schedule, such means including first and second relatively movable members, the first member having a plurality of fluid conducting passages connected to respective drive establishing mechanisms, and the second member having a pair of controlled pressure passages and adjacently disposed line pressure passages adapted to be moved into alignment with respective fluid conducting passages of the first member, the line pressure passages being connected to said fluid pressure source, and valve means connecting said fluid supply and exhaust passages to said pair of controlled pressure passages, said valve means being switchable between first and second positions for interchanging said fluid supply and exhaust passages with said pair of controlled pressure passages, the controlled pressure passages of said second member being located relative to the fluid conducting passages of said first member such that relative movement of said first and second members in one direction while said valve means is moved to the first position operates to successively connect such controlled pressure passages and adjacently disposed line pressure passages with respective fluid conducting passages of said first member for upshifting said transmission, and relative movement of said first and second member in the opposite direction while said valve means is switched to the second position operates to successively connect such controlled pressure passages and such adjacently disposed line pressure passages with respective fluid conducting passages of said first member for downshifting said transmission, each such upshift and downshift including a transient phase in which the fluid conducting passage of the first member associated with the respective drive establishing mechanism is connected to one of the controlled pressure passages of the second member to thereby permit fluid pressure to be supplied to or exhausted from such drive establishing mechanisms, and a steady state phase in which such fluid conducting passage is isolated or connected to a line pressure passage of the second member so as to maintain the actuation of the drive establishing mechanism brought about in the transient phase; and shifting means effective when it is desired to shift transmission gear ratios to switch said valve means to the first position and to produce relative movement of said first and second members in said one direction if the desired shift is an upshift, and to switch the valve means to said second position and to produce relative movement of said first and second members in said opposite direction if the desired shift is a downshift.

* * * * *